(12) United States Patent
Veeningen

(10) Patent No.: US 11,100,427 B2
(45) Date of Patent: Aug. 24, 2021

(54) MULTI-PARTY COMPUTATION SYSTEM FOR LEARNING A CLASSIFIER

(71) Applicant: KONINKLIJKE PHILIPS N.V., Eindhoven (NL)

(72) Inventor: Meilof Geert Veeningen, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 583 days.

(21) Appl. No.: 16/122,942

(22) Filed: Sep. 6, 2018

(65) Prior Publication Data

US 2019/0073608 A1 Mar. 7, 2019

Related U.S. Application Data

(60) Provisional application No. 62/678,342, filed on May 31, 2018, provisional application No. 62/555,324, filed on Sep. 7, 2017.

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
CPC ............................ G06N 20/00; G06N 16/285
See application file for complete search history.

(56) References Cited

U.S. PATENT DOCUMENTS

| | | | |
|---|---|---|---|
| 5,828,981 A | 10/1998 | Callender et al. | |
| 9,819,650 B2* | 11/2017 | Soon-Shiong | H04L 63/08 |
| 10,223,547 B2* | 3/2019 | Rane | G06F 21/602 |
| 10,554,390 B2* | 2/2020 | Jain | H04L 9/08 |
| 2017/0147921 A1 | 5/2017 | Kasahara | |

OTHER PUBLICATIONS

Arik, Springer 2015.*
Zhang, IEEE, 2017.*
Souza, Elsevier, 2016.*
Weerasooriya, University of Colombo School of Computing, 2014.*
Zhang, et al., "Private, yet Practical, Multiparty Deep Learning", 2017 IEEE 37th Conference on Distributed Computing Systems, Jun. 5, 2017, pp. 1442-1452.

(Continued)

*Primary Examiner* — Azam A Ansari
*Assistant Examiner* — Michael I Ezewoko

(57) ABSTRACT

Some embodiments are directed to a computation system for learning a classifier from a data set and associated classification data. The system comprises multiple data devices and multiple computation devices. The data set and associated classification data is stored across the multiple data devices. Classifier parameters of the classifier are learned iteratively from the data set. The learning comprises computing local error terms for the classifier from the associated classification data and from classifier results obtained from applying the classifier with the current classifier parameters to the local part of the data set, and providing the local error term as a private input to the multiple computation devices for a multi-party computation among the multiple computation devices.

7 Claims, 8 Drawing Sheets

(56) References Cited

OTHER PUBLICATIONS

International Search Report and Written Opinion for International Application No. PCT/EP2018/073645, filed Sep. 4, 2018, 17 pages.
Sammut, et al., "Encyclopedia of Machine Learning and Data Mining", Sammut & Webb, 2nd Ed, Jun. 17, 2017, p. 1067. (Abstract).
Anonymous: "Logistic Regression", Wikipedia, Jan. 2, 2017, retrieved from the internet URL:https://en.wikipedia.org/w/index.php?title=Logistic regression&oldid=757888175, 15 pages.

* cited by examiner

MULTI-PARTY COMPUTATION SYSTEM FOR LEARNING A CLASSIFIER

CROSS-REFERENCE TO RELATED APPLICATIONS

This application claims priority to U.S. patent application Nos. 62/555,324, filed on Sep. 7, 2017; and 62/678,342, filed on May 31, 2018, the entire disclosures of which are hereby incorporated by reference herein for all purposes.

FIELD OF THE INVENTION

The invention relates to a computation system, a data device, a computation device, a data method, a computation method and a computer readable medium.

BACKGROUND

Machine learning techniques are used to produce predictive models for use in many fields. Models are built from large amounts of data, which may be used to better anticipate future cases. For example, machine learning has been used to enable more efficient storage, processing and computation on big data, reducing power consumption, etc. For example, these predictive models may take the form of so-called classifiers. In a classifier, a record needs to be classified into two or more categories.

For example, in the case of a binary classifier, a record falls into one of two classes. The machine learning task may comprise learning a classifier to predict the class into which a record falls or will fall. For example, in an application records may represent features of incoming data-processing jobs and the class may represent future energy need of the job. Once learned, the classifier predicts future energy needs. The predicted future energy need may in turn be used to scale cooling of the system. As a result, cooling closer matches actual cooling needs rather than worst-case cooling needs.

A particular example of a classifier is so-called logistic regression. For example, using logistic regression one may construct a binary classifier for records with numerical attributes. Given a data set with k-valued records, the classifier may be represented by classifier parameters, e.g., organized as a vector $\beta=(\beta_1, \ldots, \beta_k)$. A record $(x_1, \ldots, x_k)$ may be classified according to whether $$\tilde{y}(\beta;x):=1/(1+\exp(-\beta_1 x_1 - \ldots -\beta_k x_k)) > T,$$

for a threshold T. Vectors are sometimes referred to herein with an arrow above them, e.g., $\vec{\beta}$ and $\vec{x}$. The threshold T may be learned from the data, but is typically used to control the balance between false positives and false negatives. To improve the classifier, one may extend the records in the data set with one attribute with a constant value, e.g., 1. The corresponding $\beta_i$ coefficient is called the intercept.

The task of logistic regression is to find the best classifier parameters for a given data set and associated classifier data. This task may be phrased as an optimization problem. Iteratively an approximation to $\vec{\beta}$ may be improved until convergence is reached. One particular optimization algorithm which may be used to solve the optimization is so-called Newton iteration. The quality of the models built from the data increases with the amount of data used to create the model.

Combining data from different sources remains an important challenge. In spite of the promise of increased accuracy and the resulting increased efficiency in storage, power consumption and the like, there are many reasons why, in practice, owners of data may be reluctant to combine their data. In particular, privacy concerns and other legal considerations may prevent data owners from pooling their data.

A potential solution to this problem may be provided by multi-party computation (MPC). Multi-party computation allows performing computations on data without revealing more of the input data than which is implicit in the computation result or which is already known to a party. Using MPC one may perform privacy-preserving data mining, in particular, to learn a classifier from data maintained by multiple distrusting data providers.

In MPC, processing takes place in a distributed way between multiple workers, with cryptographic techniques guaranteeing that no worker learns any information about the underlying data except the computation output. In general various constructions for MPC are known that differ in the number of workers supported and the conditions under which privacy and correctness are guaranteed.

MPC allows to train a logistic regression classifier based on sensitive data from multiple mutually distrusting data owners. A known MPC-based implementation of logistic regression is described in "A system for scalable privacy preserving machine learning", by P. Mohassel and Y. Zhang (included herein by reference). In the known system, machine learning algorithms are described for training linear regression, logistic regression and neural network models. The known system has two phases. In a setup phase, the data-owners secret-share their data among two non-colluding servers. In the computation phase, the two servers train various models on the clients' joint data without learning any information beyond the trained model using multi-party computation.

Unfortunately, the known system has difficulty scaling because all the data needs to be secret-shared with the servers. There is thus a need for a more efficient algorithm for privacy-preserving data-mining.

SUMMARY OF THE INVENTION

A computation system and corresponding data devices and computation devices are defined in the claims. They address these and/or other issues with the known computation system. In particular, embodiments relate to learning a classifier, such as a logistic regression classifier from multiple sensitive data sets from mutually distrusting data providers. Existing systems are inefficient, leak sensitive information, or are not accurate enough.

The computation system and corresponding data devices and computation devices are defined in the claims. Advantages of the system include that multi-party computation need not be done on the data set itself. Computations on the local data set can be done locally and in the plain. Furthermore, noise which is added to intermediate classifier parameters, e.g., to address privacy concerns, is added in the MPC domain, which reduces the leakage of the system, and/or increases convergence of the system.

An aspect of the invention concerns data devices for use in an embodiment of the computation system. An aspect of the invention concerns computation devices for use in an embodiment of the computation system. Note that, in an embodiment a data device may also be a computation device.

The data devices and computation devices are electronic devices. For example, they may be integrated in a mobile phone, set-top box, computer, and the like.

Aspects of the invention concern a data method and a computation method. These methods together can learn a classifier from a data set even if the data set is stored across multiple mutually distrustful devices.

Several deployment models for performing the multi-party computation can be used. For instance, the multi-party computation can be performed between the data devices, or the multi-party computation can be outsourced to a number of computation devices, e.g., workers in the cloud. The computation devices may repeatedly provide new estimates of the classifier parameters to the data devices and get new estimates for local error terms in return.

The invention may make it more acceptable for data providers such as data centers, factories, hospitals, etc. to contribute data to a joint model, e.g., for logistic regression. The hospitals may be involved in the computation by having to contribute a new local error term, e.g., a gradient in each iteration, e.g., for some variant of Newton iteration.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all the steps of an embodiment of the method when the computer program is run on a computer. Preferably, the computer program is embodied on a computer readable medium.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a data and computation device, FIG. 1b schematically shows an example of an embodiment of a data and computation device, FIG. 1c schematically shows an example of an embodiment of a computation system, FIG. 1d schematically shows an example of an embodiment of a computation system, FIG. 1e schematically shows an example of an embodiment of a data device, FIG. 1f schematically shows an example of an embodiment of a computation device, FIG. 1g schematically shows an example of an embodiment of a computation system, FIG. 2 schematically shows an example of an embodiment of a data device, FIG. 3 schematically shows an example of an embodiment of a computation device, FIG. 4a schematically shows an example of an embodiment of a data and computation device, FIG. 4b schematically shows an example of an embodiment of a data and computation device, FIG. 5 schematically shows an example of an embodiment of a data method, FIG. 6 schematically shows an example of an embodiment of a computation method, FIG. 7a schematically shows a computer readable medium having a writable part comprising a computer program according to an embodiment, FIG. 7b schematically shows a representation of a processor system according to an embodiment.

Figure 1A:
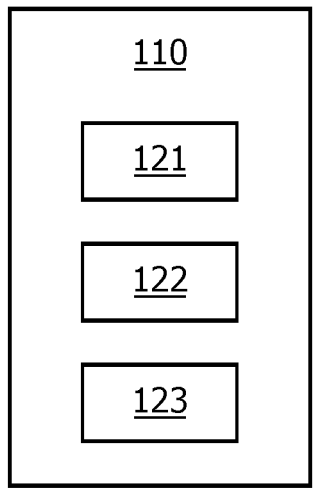

LIST OF REFERENCE NUMERALS IN FIGS.
1A-1G, 2, 3, 7A AND 7B 101, 102, 103 a computation system
110-116 a data and computation device
121, 141, 161 a processor
122, 124, 142 a storage
123, 143, 163 a communication interface
125 an external database
130-134 a data device
150 a computer network
162 a memory
170-173 a computation device
210 a data device
212 a communication interface
214 a learning manager
220 a storage
222 a local part of the data set
224 a local part of the classification data
230 a local convergence term unit
240 a classifier unit
242 classifier parameters
244 a local error term
250 a multi-party computation unit
310 a computation device
312 a communication interface
314 a learning manager
341 a global convergence term
342 a global error term
343 a noise term
344 classifier parameters
351 a MPC convergence term unit
352 a MPC error term unit
353 a MPC noise term unit
354 a MPC classifier parameters unit
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Embodiments of a computation system for learning a classifier from a data set and associated classification data comprise multiple data devices and multiple computation devices. The multiple data devices together store the data set and associated classification data. For example, the data set may comprise multiple records, and the associated classification data may comprise a classification for the multiple records. For example, the records may be numeric data. For example, a record may be represented as a vector, e.g., of numbers, e.g., integers, floating point numbers, or the like. The classifier data may be a number representing the class, e.g., an integer. For example, the classifier data may be a binary classifier. In the latter case, a bit may be associated with each record, which indicates if the record falls in a first class or in a second class. There may be more than two classes, in which case, e.g., the associated data may be an integer. It is the intention that the classifier learns to approximate the associated data, so that for new data the classification can be predicated., e.g., for new data records for which classification data as in the associated classification data is not available, Non-numeric data in the data records or classifier data may be handled by converting the non-numeric data to numeric data, e.g., using a look-up table.

For example, the record may describe a job for a factory, or a data center, etc., and the classification may be an energy requirement, e.g., low, or high, according to a corresponding threshold. After the classifier has been learned, the classifier may be applied to new incoming jobs so that future energy requirements can be approximated, e.g., by adding the estimations for the various jobs. Depending on the estimated energy requirements, the cooling may be increased or decreased. See, for an example of this use of classifier learning, e.g., 'Machine Learning Applications for Data Center Optimization', by Jim Gao.

Logistic regression is also used in a medical context. For example, logistic regression is used in Chronic Disease Management, where logistic regression may be used to detect or predict presence of diseases. In this context, combining data from multiple hospitals is important to get an accurate and general model, and obtaining this data can be difficult, especially in case of rare diseases where anonymizing data sets on a per-hospital basis is almost impossible.

As a motivating example, a logistic regression classifier, e.g., as described in the background will be used. In that case, the vector β (or a subset thereof) may be regarded as the classifier parameters that are to be learned from the data set. Embodiment using logistic regression may be adapted by a skilled person to other types of classifiers. For example, the classifier may be linear or non-linear regression, logistic regression, neural network, and the like. For example, the classifier may be represented by classifier parameters. For example, the classifier parameters may be represented by parameters that are learned from the data set and the associated classifier data. In addition to parameters learned from the data, there may be unlearned parameters, e.g., the number of numbers in the records, the number of layers, hidden layers, nodes, and the like in a neural network, the degree of a non-linear regression, etc. These parameters may be regarded as fixed elements of the classifier.

For example, the multiple records may each comprise a set of numbers, and the classifier parameters may comprise a parameter for each number in the set of numbers. For example, in a classifier these two sets of numbers may be represented as a vector, and applying the classifier may comprise computing an inner product or dot product of the record vector and the classifier vector.

In an embodiment the computation system comprises multiple data devices and multiple computation devices. The data set and associated classification data from which the classifier parameters are to be learned are stored across the multiple data devices. Part of the required computations is carried out at the data devices, part of the computations are carried out by computation devices.

For example, in an embodiment there may be two or more, three or more, etc., data devices which are each distinct from two or more, three or more, etc., computation devices. For example, in an embodiment there are 100 data devices that each store one or more records of the data set, and 3 computation devices.

One or more or all of the data devices may also perform the computations of the computation devices, that is, one or more of the data devices may also be computation devices. For example, in an embodiment, at least one data device of the multiple data devices is a computation device of the multiple computation devices. In an embodiment, all of the data devices are also a computation device. For example, in an embodiment there may be two or more, three or more, etc., joint data and computation devices.

FIG. 1a schematically shows an example of an embodiment of a data and computation device 110. Data and computation device 110 comprises a processor 121, a storage 122, and a communication interface 123. Storage 123 is arranged to store a local part of the data set and a corresponding local part of the associated classification data. For example, a data device i, e.g., 1≤i≤number of data devices, may have data records $X_i$ and associated data $y_i$. For example, in case of a binary logistic regression classifier $y_i$ may be a binary vector, and $X_i$ may be a matrix having a row or column for each record. An element in the vector $y_i$ contains the classification of the corresponding row or column of the matrix $X_i$, which classification is to be learned by the classifier. The storage may be local storage, e.g., a magnetic storage, e.g., a hard drive, or electronic storage, e.g., an electronic memory, e.g., a flash memory. The memory may be volatile or non-volatile.

Figure 1B:
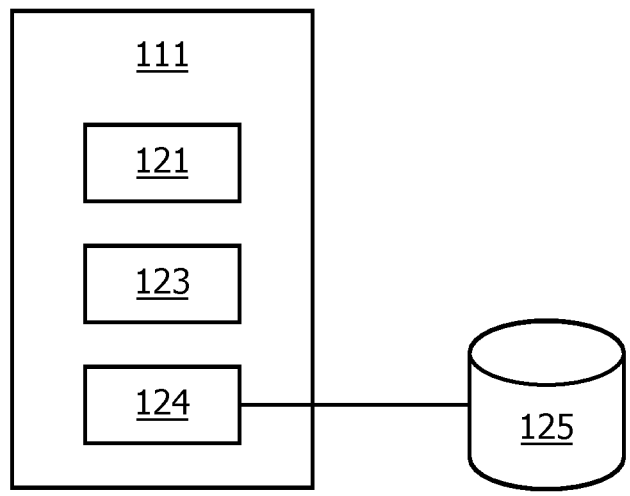

FIG. 1b schematically shows an example of an embodiment of a data and computation device 111, in which the storage uses non-local storage. Data and computation device 111 may comprise a storage interface 124 which interfaces to off-side storage 125, e.g., to a storage at an external computer, e.g., a cloud storage. For example, interface 124 may communicate with the external storage over a computer network. For example, the external storage may be accessible to device 111, only and not to the other devices in the computation system. The computation system may use only local, only non-local storing devices or a mixture.

Figure 1C:
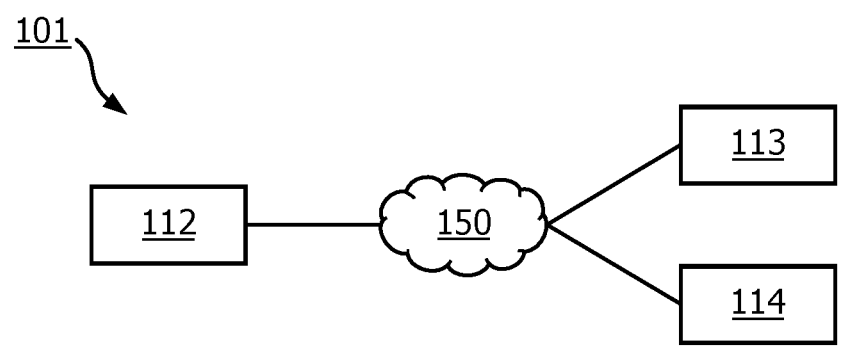

FIG. 1c schematically shows an example of an embodiment of a computation system 101. System 101 comprises two or more joint data and computation devices, e.g., as devices 110 or 111, which are connected through a computer network 150. Shown are three joint data and computation devices 112, 113, 114.

The various devices of system 101 communicate with each other over a computer network 150. The computer network may be an internet, an intranet, a LAN, a WLAN, etc. Computer network 150 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface 123 which is arranged to communicate with other devices of system 101 as needed. For example, the connection interface may comprise a connector, e.g., a wired connector, e.g., an Ethernet connector, or a wireless connector, e.g., an antenna, e.g., a Wi-Fi, 4G or 5G antenna.

For example, data and computation devices 110-114 may comprise a communication interface 123. Computer network 150 may comprise additional elements, e.g., a router, a hub, etc. In a data and/or computation device, the communication interface 123 may be used to receive messages of a multi-party computation protocol. The messages may be digital messages, e.g., received in electronic form.

In an embodiment, data devices do not need to communicate among themselves but only to computation devices. Typically, a data device communicates with all of the multiple computation devices, but this is not necessary, a computation device could act as a gateway to the other computation devices. In the latter case a data device needs only communicate with a single computation device. The computation devices communicate among themselves and with the data devices. Typically, a computation device will communicate with all data devices, but this is not necessary.

Figure 1D:
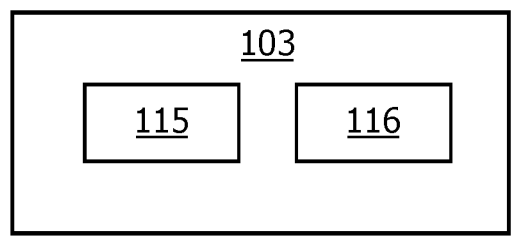

FIG. 1d schematically shows an example of an embodiment of a computation system 103. System 103 as shown comprises two or more joint data and computation devices, e.g., as devices 110 or 111. Shown are two joint data and computation devices 115 and 116. System 103 is implemented as a single electronic device comprising data and/or computation units, which are arranged to communicate with each other, e.g., over a local communication system of system 103, e.g., a local communication bus. Security inside device 103 is improved because the units 115 and 116 mistrust each other. A security breach in any one of the unit may compromise the information in that unit, but may not compromise the information stored in the other units. For example, device 103 may be a multi-core device, each unit being implemented by a different core. For example, device 103 may be configured with an operating system, the units running as independent processes, e.g., applications, in the operating system.

The devices 110-116 are joint data and computation devices. That is, they comprise storage for storing information, e.g., part of the data set, etc., but are also capable to send and receive all the required digital messages to learn the classifier parameters from the data set. The skilled person will be able to adapt the embodiments described above into separate data devices and computation devices, e.g., as described herein.

Figure 1E:
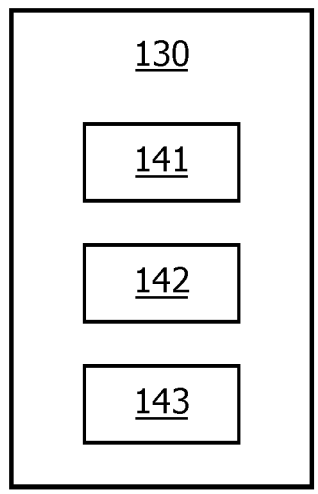
Figure 1F:
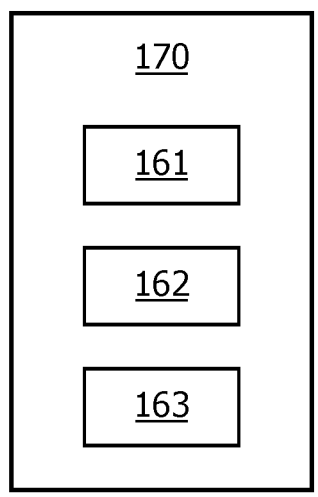

FIG. 1e schematically shows an example of an embodiment of a dedicated data device 130. Data device 130 comprises a processor 141, a storage 142 and a communication interface 143. FIG. 1f schematically shows an example of an embodiment of a dedicated computation device 170. Computation device 170 comprises a processor 161, a memory 162, and a communication interface 163. Memory 162 may be used to temporarily store data of the learning algorithm. If device 130 and 170 are combined in a joint device, then part of storage 142 may be used as memory 162.

Figure 1G:
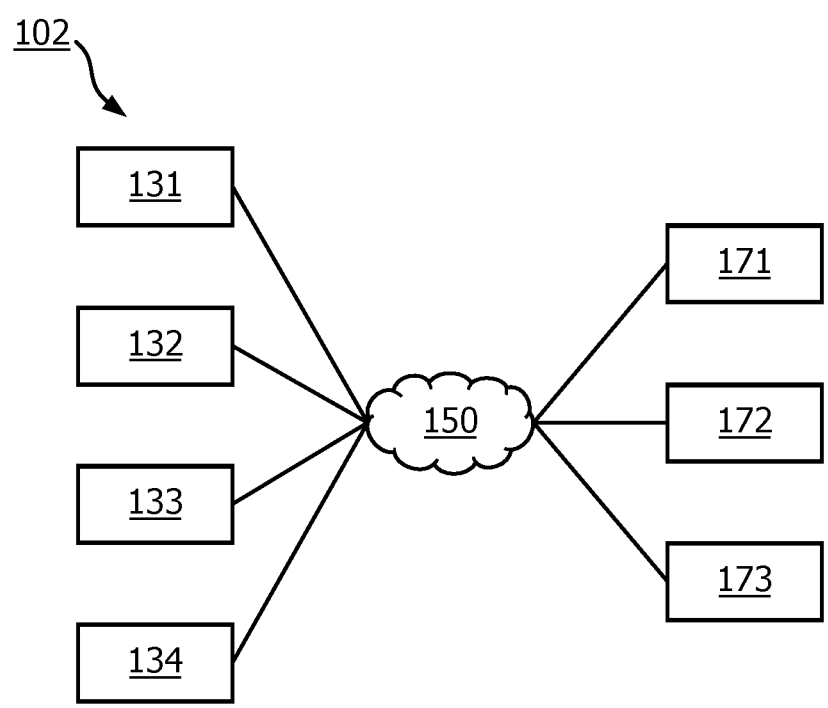

FIG. 1g schematically shows an example of an embodiment of a computation system 102. System 102 comprises two or more data devices and two or more computation devices, e.g., as devices 130 or 170 respectively, which are connected through a computer network 150. Shown are four data devices 131-134, and three computation devices 171-173. The communication interfaces, processor, storage, and the like, in FIGS. 1e-1g may be as in FIGS. 1a-d.

Figure 2:
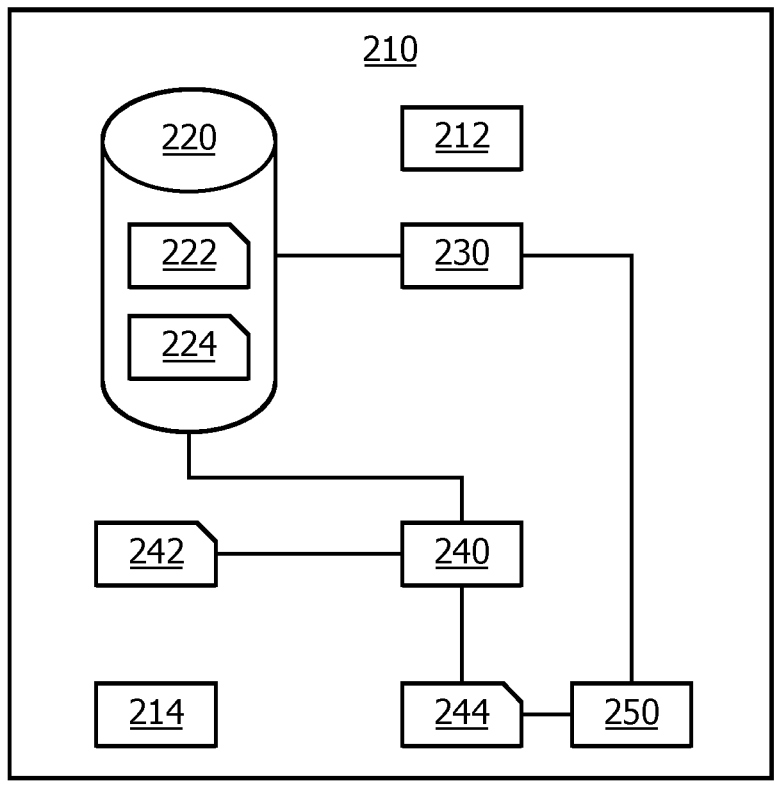
Figure 3:
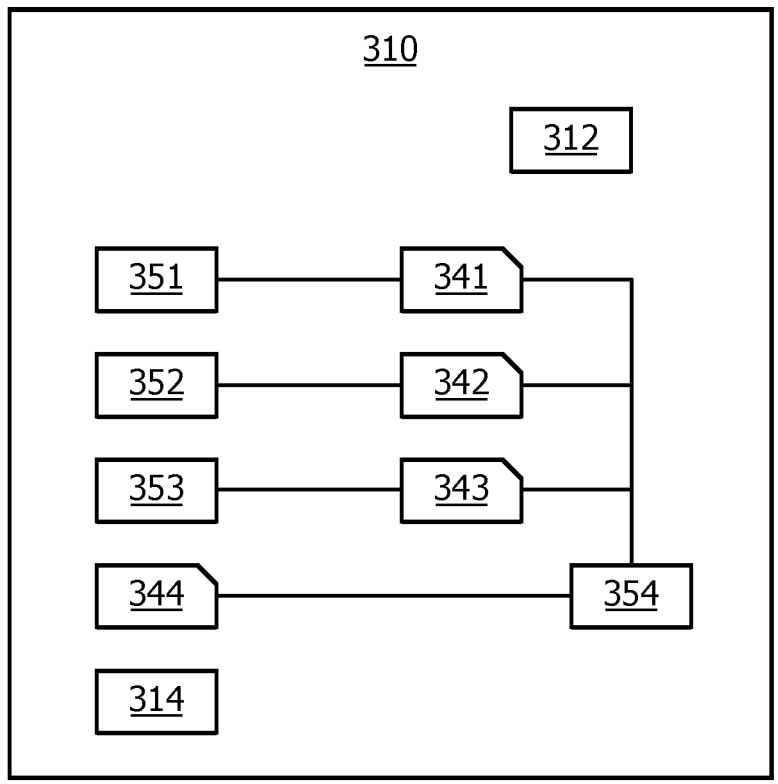

The execution of a data and/or computation device is implemented in a processor. The processor may be a processor circuit, examples of which are shown herein. FIGS. 2 and 3 below show functional units that may be functional units of the processor, e.g., processor circuit. For example, FIGS. 2 and 3 may be used as a blueprint of a possible functional organization of the processor, e.g., processor circuit. The processor is not shown separate from the units in FIGS. 2 and 3. For example, the functional units shown in FIGS. 2 and 3 may be wholly or partially implemented in computer instructions that are stored at a data and/or computation device, e.g., as in a device such as devices 110-116, 130-134, and/or 170-173, e.g., in an electronic memory thereof and are executable by a microprocessor of the device. In hybrid embodiments, functional units are implemented partially in hardware, e.g., as coprocessors, e.g., crypto coprocessors, and partially in software stored and executed on the data and/or computation device.

FIG. 2 schematically shows an example of an embodiment of a data device 210. FIG. 3 schematically shows an example of an embodiment of a computation device 310. Two or more data devices, e.g., as data device 210 together with two or more computation devices, e.g., as computation device 310 may cooperate to form a computation system to learn a classifier. Data device 210 comprises a communication interface 212, e.g., as described above. Communication interface 212 may be arranged to communicate with the multiple computation devices. Computation devices 310 comprise a communication interface 312, e.g., as described above. Communication interface 312 may be arranged to communicate with the multiple computation devices and the multiple data devices.

Data device 210 and computation device 310 may be combined into a joint data and computation device. Multiple joint data and computation devices may form a computation system, possibly, together with one or more dedicated data devices and/or one or more dedicated computation devices.

Data device 210 comprises a storage 220. Storage 220 stores a local part of the data set 222 and a corresponding local part of the associated classification data 224. In an embodiment, data device 210 is not arranged to provide read access to other devices of the computation system. However, data device 210 is configured to use the local parts 222 and 224 in a multi-party computation protocol, e.g., as described herein. Data device 210 only stores a part of the data set and classification data, the rest of the data set and classification data is stored in other data devices of the multiple data devices of the computation system.

Data device 210 comprises a classifier unit 240. Classifier unit 240 has access to classifier parameters 242. Classifier unit 240 is arranged to receive a record, e.g., a record such as stored in the data set, and to output a classification, e.g., such as in the classification data. Initially, the classifier parameters 242 are not learned, and the classification of classifier unit 240 is not accurate. Once the classifier parameters 242 are learned the classification of the classifier unit 240 improves; For example, provided with the records from the data set 222, the outputs of classifier unit increasingly approximate the classification data 224. Initially, the classifier parameters 242 are initialized to initial values. For example, the initial values may be zero, or may be random, etc. In an embodiment, the data device comprises a random number generator for initializing classifier parameters 242; said initial classifier parameters being communicated to the other devices in the computation system. Using random initial values may reduce the chance of divergence or local optima; especially if the learning is repeated from multiple initial values. In an embodiment, the initial values of all data and computation devices are the same, but this is not strictly necessary. For example, even if the data devices start from different initial values, they will receive the same classifier parameters after a single iteration.

The computation system iteratively learns the classifier parameters from the data set in multiple iterations. The classifier parameters are modified in the iteration rounds to improve the accuracy of the classifier unit. In an embodiment, the iteration is repeated until convergence is achieved. In an embodiment, the number of iterations may be determined before the first iteration; For example, the number of iteration may depend on the size of the data set. For example, the number of iterations may be a fixed number. The latter has the advantage that no information on the protocol is leaked through the number of iterations, or, e.g., the amount of time it takes until convergence is reached.

For example, data device 210 may comprise a learning manager 214 which is configured to execute the learning algorithm on data device 210, e.g., to cause the iterations to be executed.

In an iteration, classifier unit 240 is applied to the records in the data set part 222 using the classifier parameters 242. The classifier results are then compared to the classifier results 224, and a local error term 244 is thus computed. The local error term 244 indicates how well or how bad the classifier unit using the current classifier parameters 242 approximates the local data 222 and 224. In an embodiment, for each record in set 222 the difference between the corresponding classification in classifier data 224 and the classifier result of classifier unit 240 is computed. Local error term 244 may be computed from these differences; for example, the local error term may be a scalar, e.g., computed as a sum of the squares of the errors, or the local error term may be a vector, e.g., the tangent of the sum of the squares of the errors. In an embodiment, the differences are weighted with the values in the record, to obtain a per record-entry local error term. Such a local error term may be represented as a vector, e.g., of the same length as a record and as the classifier parameters. An advantage of weighing the error term with the entries in the records is that the local error term not only gives information on the size of the error, but also on which classifier parameters may be modified to effectively decrease the error.

Local error term 244 is provided as a private input to the multiple computation devices for a multi-party computation among the multiple computation devices. For example, data device 210 may comprise a multi-party computation unit 250. MPC unit 250 may secret-share local error term 244 across the multiple computation devices. Several styles of multi-party computation may be used in the computation system.

For example, information that is to be kept private is shared by computing a secret share for each party that needs to compute with the private information. For example, data device 210 may compute a share of the local error term for each computation device, and send the share to the respective computation device. The computation devices can now compute with the data using an appropriate MPC protocol. The private information can only be accessed in the plain if a sufficiently large subset of the parties disclose their secret-share. How large the subset should be depends on the security requirements.

For example, in an embodiment, the MPC in the data devices and computation devices may be based on Shamir secret sharing. In this case, a data device computes a Shamir secret-share of the local error term, e.g., a share for each entry in the local error term and for each computation device. For example, MPC primitives may be used as described in "Design of large scale applications of secure multiparty computation", by de Hoogh, S. J. A (included herein by reference).

For example, in an embodiment the MPC is based on garbled circuits. An example of garbled circuits is provided below.

For example, in an embodiment, the MPC is based on the SPDZ Protocol Suite, e.g., as described in "Practical Covertly Secure MPC for Dishonest Majority—Or: Breaking the SPDZ Limits", by Damgard, et al. (included herein by reference); or as implemented in the open source library Fresco; FRESCO is a FRamework for Efficient and Secure COmputation, written in Java and licensed under the open source MIT license.

After the multiple computation devices receive the local error terms from the multiple data devices, the multiple computation devices can compute classifier parameters which are to be used in the next iteration. For example, data device 210 may receive the new values for the classifier parameters from one or more of the computation devices; and stores the new classifier parameters in classifier parameters 242. For example, if the data device receives the new classifier parameters from more than one computation device, then data device 210 may be configured to verify that they are the same. In an embodiment, the new classifier parameters are secret-shared with data processing device 210 from multiple computation devices, so that the classifier parameters can be opened on the data processing device, i.e., they are available in the plain on the data processing device, but may be available only as a shared secret at the computation devices.

An advantage of embodiments described herein is that the local part of the data set and the corresponding local part of the associated classification data do not need to be secret-shared. All computation on the local part of the data may be computed locally and may be performed on plain data. Since data sets can be large, this significantly reduces computation resources. Likewise, the classifier parameters and the local error term may be available in the plain on the data processing device. This is an advantage since the local error term is computed over the local data set, which can be large; it is thus advantageous that these computations can be done in the plain.

In an embodiment, data device 210 may comprise an optional convergence term unit 230. Convergence term unit 230 is further described elsewhere.

Continuing with FIG. 3. Computation device 310 is configured to obtain initial values for classifier parameters 344 of the classifier, and cooperates with the data devices to iteratively learn the classifier parameters of the classifier starting from the initial values. In an embodiment, the iterations are synchronized between the data devices and the computation devices. For example, the rounds of the data devices interleave with those of the computation devices.

Computation device 310 may comprise an iteration manager 314. Like iteration manager 214, iteration manager 314 enables computation device 310 to iterate through a number of iterations. In an embodiment, the number of iterations is the same as for the data devices. The number may be determined as for the data devices. Computation device 310 comprises a MPC classifier parameters unit 354 which is configured to compute new classifier parameters jointly with the other computation devices in a multi-party computation. MPC classifier parameters unit 354 computes new parameters each iteration, and takes as input a global error term 342, and a noise term 343. MPC classifier parameters unit 354 may also use a convergence term 341, which may be derived from the data set, but which may also be independent form the data set. If the convergence term is computed dynamically, e.g., from the data set, an optional MPC convergence term unit 351 may be used to compute a global convergence term 341. The convergence term may be included in the computation of the new classifier parameters for improving the converging of the classifier coefficients. For example, the convergence term may scale the error term. For example, the convergence term may be a matrix for modifying the error term.

To approximate the classifier, any algorithm that iteratively optimizes based on an error term may be used. In each iteration the different data devices provide contributions to the iteration based on their sensitive data, whereas the rest of the iteration is done at the computation devices. A particular advantageous choice is Newton iteration. In Newton iteration an error term is computed, also termed the gradient, and the classifier parameters are modified based on the gradient.

Computation unit 310 may comprise a MPC error term unit 352. MPC error term unit 352 may be configured to compute a global error term over the data set from the local error terms of the multiple data devices. MPC error term unit 352 computes this using a multi-party computation and jointly with the multiple computation devices. Computation device 310 does not have plain access to the local error term of data device 210 or the local error term of any of the other data devices. The local error term is only available as a private input. A private input may be a share in the data. The private input may also be implicit, e.g., as a garbled circuit, e.g., in which the private input has been incorporated.

Even though, the local terms are not explicitly available, using an MPC protocol suite, such as one of those mentioned above, computations can nevertheless be made on the private inputs. For example, the computation devices may be configured to add the local error terms to obtain a global error term. The global error term is only shared across the computation devices, e.g., as a private input, and is not available in the plain.

Computation device 310 may comprise a MPC noise term unit 353. MPC noise term unit 353 is configured to compute a noise term 343, wherein the joint computation is a multi-party computation and the noise term is shared over the multiple computation devices. This computation is also done jointly with the multiple computation devices as a multi-party computation. The result of the MPC noise term unit 353 is that a noise term is shared over the multiple computation devices, but none of the computation devices has access to the plain noise term.

MPC classifier parameters unit 354 computes new classifier parameters using the global error term 342. For example, the previous classifier parameters 344 may be modified in a direction determined by global error term 342. MPC classifier parameters unit 354 also adds the noise term 343. This computation is done jointly with the multiple computation devices. In an embodiment, the results of the computation are opened at the computation devices, so that the new classifier parameters are known in the plain at the computation devices. The new classifier parameters are then communicated to the data devices; e.g., one or more of the computation devices send the new classifier parameters to the data devices; e.g., each of the computation devices sends the new classifier parameters to each of the data device, and so on. In this case, communication from the computation devices to the data devices may be in the plain, or may be conventionally protected, e.g., encrypted.

In an embodiment, the new classifier parameters are not opened at the computation devices but are only shared among the computation devices. However, the data devices receive the new classifier parameters as private outputs from the multiple computation devices, e.g., they receive secret-shares, so that the new classifier parameters can be opened locally at the data devices.

In both situations the new classifier parameters are not the direct result of a converging algorithm, e.g., Newtonian iterated convergence or an optimizing algorithm, e.g., hill climbing. Instead, a noise term is added to the intermediate classifier parameters.

The noise term protects the processing result and protects sensitive information from the recipient of the analytics outcome, e.g., using differential privacy. This improves the performance of MPC, by opening intermediate values. Noise is added to an analytics outcome in order to limit the amount of information that the outcome can give about any single record in the data set. In an embodiment, the amount of leakage permitted is captured by a privacy budget, typically denoted $\epsilon$. Every time when disclosing a value that depends on sensitive information, part of this budget is spent. The more budget spent on disclosing a particular value, the less noise needs to be added. Differential privacy can be used to ensure that a classifier does not leak information about individual records, or at least limit the leakage.

Noise could have been added locally, e.g., to the local error term, or to the local classifier parameters before computing the local error term. However, by adding noise after the new classifier parameters are computed normally, less noise is needed. The global noise term could also be added to the global error term. Adding differentially private noise locally, e.g., to the local error terms means that the privacy budget for the algorithm needs to be distributed over many disclosures; moreover, because each individual data set is relatively small compared to the full data set, the noise that needs to be added to achieve differential privacy is relatively large. Indeed, experiments suggest that only adding local noise without using MPC to add global noise distorts the algorithm to such an extent that the algorithm no longer gives accurate results.

The multiple computation devices receive the new values of the classifier parameters. This may be in the form of a private output, which in the next iteration is used as a private input as the new classifier parameters. This may be in the plain, e.g., by opening the private output. The data devices obtain the new classifier parameters in the plain, either by receiving them directly in the plain, or by opening them at the data devices; so that the data device can use the classifier parameters for computations without using an MPC protocol. Note that, even if values are received in the plain, this does not preclude the possibility that they may be communication using protected communication, e.g., encrypted and/or authenticated for a device.

As discussed in the background, it is possible to perform logistic regression in a fully private way. However, in this case the entire algorithm needs to be performed fully under MPC, and in particular, the local error term needs to be evaluated under MPC for every item in the data set. This is computationally expensive. By keeping successive approximations of the classifier parameters open, the computation in the encrypted domain does not depend on the number of items in the respective data sets, and hence is much faster.

Computing the noise can be done using various known algorithms, which may be, e.g., as described in "Privacy-preserving logistic regression" by Chaudhuri, et al.; or "Differentially private empirical risk minimization", by Chaudhuri, et al. (both papers included herein by reference). A noise vector [$\vec{n}$] may be computed and then added to the new value for the classifier parameters, e.g., $\vec{\beta}$, before opening it. For example, the computing device may generate a random seed and contribute it as a private input to the computation. The seeds are then combined, e.g., added, and noise is drawn, in dependence on the seed, e.g., from a desired noise distribution.

In an embodiment, the number of iterations to be performed is fixed. This has several advantages. First, if the number of iterations is known beforehand this may be used to decide how to divide the privacy budget E between disclosures. Second, the algorithm may not fully converge anyway, due to the noise added in every iteration; this makes convergence a less suitable stopping criterion. Finally, the amount of noise to be added increases with the number of iterations so it is profitable to fix the number of iterations.

In an embodiment, the local error term is merely used to verify if the classifier is improving, or as an approximate direction in which to move the classifier parameters. For example, the computation device may keep a record of subsequent error terms to judge if new classifier parameters are an improvement. If so a further change in the same direction may be made, if not the direction of change may be changed. The magnitude of the change may decrease with the number of iterations. For example, the iteration may be a hill climbing or simulated annealing algorithm. Optimizing algorithms are particularly useful for classifiers which are hard to optimize. For example, after first classifier parameters $\beta^1$ have been used to determine a first global error term, second classifier parameters $\beta^2$ may be selected. The second classifier parameters $\beta^2$ may be used to determine a second global error term. If the second global error term improves on the first global error term, then third classifier parameters $\beta^3$ may be computed starting from second classifier parameters $\beta^2$, and if not third classifier parameters $\beta^3$ may be computed starting from first classifier parameters $\beta^1$. In this example, new classifier parameters may be selected by adding a random vector, or modifying a random element. The random vector may be selected according to a known optimizing algorithm, e.g., simulated annealing, Tabu search, hill climbing, etc.

It is advantageous however, to use converging iterations; or at least an iteration algorithm that would converge in the absence of the noise term. An example of such an algorithm is Newtonian iteration.

To improve the convergence, the computing device may compute the new values for the classifier parameters by computing a product between the global error term and a convergence term. The global error term is computed from the local error terms. The convergence term determines how much the global error term changes the classifier parameters. The convergence term may be proportional of a tangent at an error function of the classifier, e.g., a sum of error squares. In the latter case, the convergence term may also be referred to as a derivative term. The iterations may also employ an algorithm known optimization methods known as "gradient descent" or "stochastic gradient descent"; these may also include a derivative term.

Computing the convergence term may comprise computing the Hessian of the data. The convergence term can be computed from the data set. Although this appears to be best for convergence, it is not necessary. The convergence term may also be predetermined, e.g., determined from similar but public data. An advantage of this approach though is that the convergence term may be available in the plain at the computation devices.

In an embodiment, data device 210 comprises a local convergence term unit 230. Local convergence term unit 230 is configured to compute a local convergence term from the local part of the data set, and to provide the local convergence term as a private input to the multiple computation devices for a multi-party computation. Computation device 310 comprises an MPC convergence term unit 351 arranged to compute the global convergence term 341. MPC convergence term unit 351 may be arranged to compute global convergence term 341 from the local convergence terms of the multiple data devices as private inputs. The computation is done jointly with the multiple computation devices wherein the joint computation is a multi-party computation and the global convergence term is shared over the multiple computation devices.

In an embodiment, the computation device is configured to compute the sum of the noise term and the product between the global error term and the global convergence term, jointly in a multi-party computation with the multiple computation devices. The sum is shared among the multiple computation devices, e.g., as a private input. After its computation, the sum may be opened so that the new values of the classifier parameters may be computed locally.

After completion of the iterations for learning the classifier parameters, the data device or computation device may be configured to use the classifier. For example, the data and/or computation device, e.g., its processor, may be configured to:
    receive an input record
    apply the classifier to the input record,
    communicate the classifier output.

In an embodiment, the computation device does not learn of the plain values of the classifier parameters, in this case the classifier unit of the data device may be used. The input record may be received over a communication interface, e.g., a computer network interface, or a keyboard, etc.

In the various embodiments of data device 210 and computation device 310, the communication interface may be selected from various alternatives. For example, the interface may be a network interface to a local or wide area network, an internal or external interface, an application interface (API), etc. The interface may be used to receive record, classifier data, protocol messages, etc.

The data device 210 and computation device 310 may have a user interface, which may include well-known elements such as one or more buttons, a keyboard, display, touch screen, etc. The user interface may be arranged for accommodating user interaction for performing a learning action. The user interface may also be used to use a classifier unit after it has been trained.

Storage 220 may be implemented as an electronic memory, say a flash memory, or magnetic memory, say hard disk or the like. Storage 220 may comprise multiple discrete memories together making up storage 220. Storage 220 may also be a temporary memory, say a RAM. In the case of a temporary storage 220, storage 220 contains some means to obtain data before use, say by obtaining them over an optional network connection (not shown).

The data and computation devices may be a single device. Below an embodiment of learning a classifier, in this case a logistic regression classifier using MPC is given for such a device in mathematical terms. The algorithm uses as input: $X_i$, $y_i$: data sets and classifier data for party i; $\lambda$: a regularization parameter; $\epsilon$: a differential privacy parameter (e.g., the privacy budget); N: number of iterations. The algorithm produces as output classifier parameters $\beta$. Values in brackets are secret. By parties i do [a]:=b we mean that each party can locally compute b and secret-shares it with the other parties as secret value [a].

```
1.  function Logreg (X_i, y_i, λ, ∈, N):
2.      parties i do [H_i] := 1/4(X_i)^T X_i
3.      [H] := Σ_i[H_i] - λI
4.      β := (0, ... ,0)
5.      for it = 1, ... , N do
6.          parties i do for k = 1, ... do [(l_i)_k] := Σ_j((y_i)_j - ŷ(β; (X_i)_j))
                (X_i)_{j,k}
7.          [l] := Σ_i[l_i] - λβ
8.          [n] := GenNoise(Σ_i|X_i|,∈ /N)
9.          β := β - [H^{-1}][l] + [n]
10.     return β
```

In line 1, a local convergence term $H_i$ is computed from the local data set $X_i$ of party i. The local convergence term may also be referred to as a local Hessian. The local convergence term is shared across the multiple devices as a private input. In line 3 the global term H is computed from the local convergence terms. The global term [H] is computed in an MPC protocol shared across the devices from secret data [$H_i$] producing secret data [H]. In line 4 the classifier parameters are initialized, in this case to the all zero vector. In line 5 the iteration is managed to run from 1 to a fixed integer N. In line 6, a local error term $l_i$ is computed, wherein k runs over the elements in a record of data set $X_i$. Note that the classifier using the current classifier parameters is applied to a data record $(X_i)_j$ of data set $X_i$, in $\hat{y}(\beta;(X_i)_j)$. The difference between the actual classifier result and the classification data $(y_i)_j$, is then weighted against the value of the record entry $(X_i)_{j,k}$, so that elements in the local error term correspond to elements in a record, and are weighted by them. In line 7, a global error term is computed from the local error terms by adding the local error terms; this is done in a multiparty computation. A regularization term is subtracted from the global error term. In line 8 a global noise term is computed by calling a function GenNoise. In this case, the amount of noise depends on the total number of records, and the total number of iterations. In line 9, new classifier parameters are computed from the global error term and the noise term. First a modification of the classifier parameters is computed: $[H^{-1}][l]+[n]$. The inverse of the Hessian is used as a global convergence term, to improve convergence of the iteration. Once the modification of the classifier parameters has been computed, they can be opened and subtracted from the classifier parameters $\beta$. An advantage of the algorithm above is that computations over the local data set are done in the plain, while noise is added globally.

The above algorithm can be modified to run on separate data devices and computation devices. For example, the computations of lines 2, 4, 5, 6, and 10 may be done at the data devices, while the computation device may perform the computations of lines 3, 4, 5, 7, 8, 9 and 10. In addition, the data devices may share the local error term with the computation devices, and the computation devices may send or share the new classifier parameters with the data devices. Line 9 may be modified so that the computation devices only compute the new classifier parameters in secret, e.g., as a private input. In that case, the new secret classifier parameters may be shared with the data devices, e.g., sent as secret-shares to them, where they are opened. This approach avoids that the computation devices learn the classifier.

The function GenNoise(M,$\epsilon$) represents a function generating differentially private noise for $\vec{\beta}$ given data set size M and privacy budget $\epsilon$. This can be implemented, as suggested in the papers by Chaudhuri mentioned above, e.g., by drawing $\vec{n}$ from a Laplacian distribution, i.e., by drawing a random norm from the $\Gamma(d,2/(N\epsilon\lambda))$ distribution and a uniformly random direction, and letting $\vec{n}$ be the vector with that norm and direction. Here, d is the number of attributes in the data set. We remark that this value assumes that the inputs are normalized, i.e., each record $\vec{x} \in \mathbb{R}^n$ has Euclidean norm≤1. Drawing the random vector needs to be performed under MPC. Note that GenNoise is called with privacy budget $\epsilon/N$, which is the overall privacy budget E divided by the number of openings. In simplified versions of the algorithm, the function GenNoise may not use parameters, but have a fixed noise parameters, or take a desired noise distribution as input, etc.

In an embodiment, the value $[H^{-1}]$ in line 9 is not computed exactly, but instead, the Cholesky decomposition of $[-H]$ is computed once and $[H^{-1}][l]$ is repeatedly computed by back substitution, e.g., as described in "Privacy-preserving ridge regression on hundreds of millions of records", by V. Nikolaenko, et al. (included herein by reference).

Figure 4:
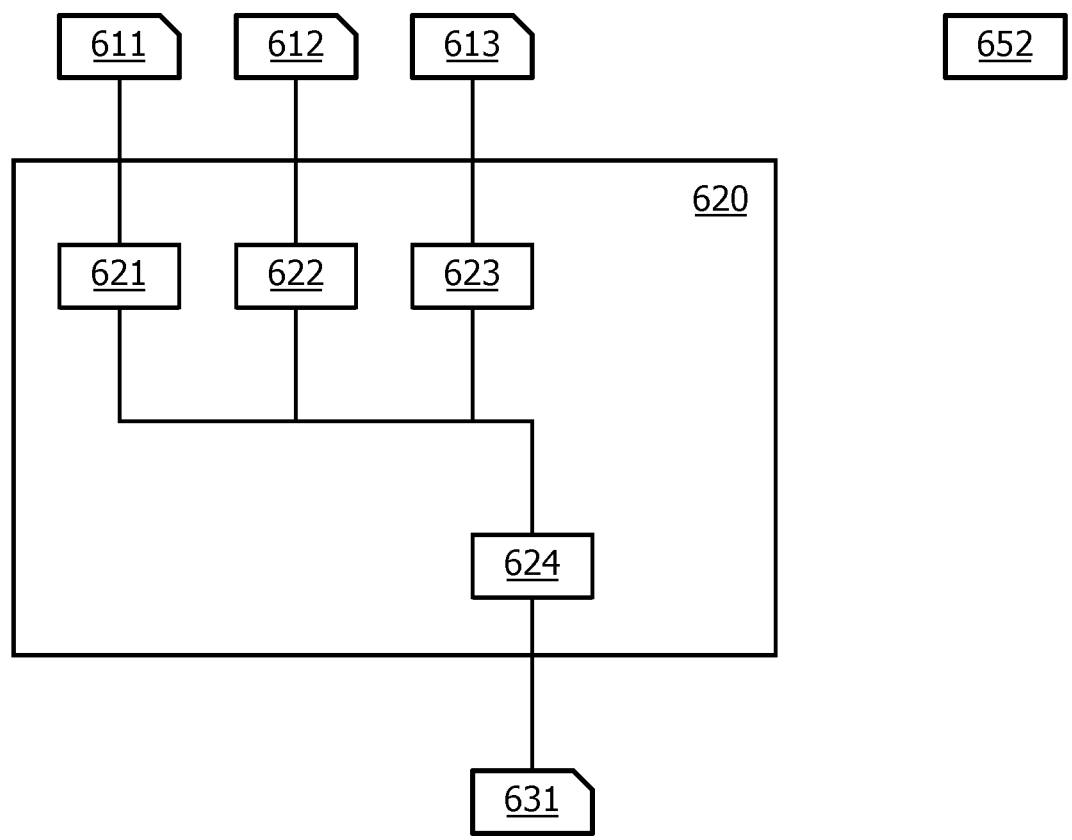

FIGS. 4a and 4b schematically shows an example of an embodiment of a data and computation devices using garbled circuits. In this example, two joint data and computation devices are used: a first joint data and computation device 651 and a second joint data and computation device 652; the embodiment may be extended to more than two joint data and computation devices. The embodiment may also be extended with one or more dedicated data and/or computation devices.

In this example, the first joint data and computation device 651 locally computes, using plain data, the values $H_1$ (641), $l_1$ (642), $s_1$ (643). The first two may be computed as in lines 2 and 6 above, although without secret-sharing the results. The value $s_1$ is a seed for computing the noise value. The first computation device 651 may use a plain value for the classifier parameters, locally stored at the first computation device 651.

The first computation device 651 further determines a circuit 620 for computing the new classifier parameters from the values $H_1$ (641), $l_1$ (642), $s_1$ (643) and from information available to the second joint data and computation device 652. Circuit 620 is a so-called garbled circuit.

A garbled circuit is evaluated between the first and second device as a cryptographic protocol. Garbled circuits are a type of multi-party computation that enables two-party secure computation, so that two mistrusting parties can jointly evaluate a function over their private inputs without the presence of a trusted third party. In the garbled circuit protocol, the circuit 620 is described as a Boolean circuit.

The protocol may comprise the following steps:

The underlying function for circuit 620 is described as a Boolean circuit with 2-input gates. The circuit is known to both parties. This step can be done beforehand.

The first device 651 garbles, e.g., encrypts, the circuit. The first device 651 is the so-called garbler.

The first device 651 sends the garbled circuit to the second device 652 along with its encrypted input 641, 642, 643.

The second device 652 through oblivious transfer receives its encrypted inputs from the first device 651.

The second device 652 evaluates, e.g., decrypts, the circuit and obtains the encrypted outputs. The second device 652 is the so-called evaluator.

The first device 651 and the second device 652 communicate to learn the output 631, e.g., the new classifier parameters.

The circuit 620 is illustrated in FIG. 4b. The second device 652 computes in the plain the values $H_2$ (611), $l_2$ (612), $s_2$ (613) from information available to it. The circuit 620 comprises a part 621 to compute the value H, a part 622 to compute the value l, and a part 623 to compute the noise value n. These parts may depend on the encrypted values 641, 642, and 643 respectively. These encrypted values may be provided to the second device 652 as above, or the circuit may be partially pre-evaluated by the first device 651 for these values. Finally, a part 624 computes the new classifier parameters 631. Part 624 may depend on plain values β, e.g., as an input to circuit 620, or part 624 may be partially evaluated for the classifier parameters of the first device 651. The output 631 of circuit 620 is opened and shared with the first and second device.

Typically, the data and/or computation devices (e.g. devices 110-116, 130-134, 170-173, 210, 310, 651, 652) each comprise a microprocessor which executes appropriate software stored at the data and/or computation devices; for example, that software may have been downloaded and/or stored in a corresponding memory, e.g., a volatile memory such as RAM or a non-volatile memory such as Flash. Alternatively, the data and/or computation devices may, in whole or in part, be implemented in programmable logic, e.g., as field-programmable gate array (FPGA). Data and/or computation devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

The processors may be processor circuits. The various units, e.g., of FIGS. 2 and 3 may be implemented as circuits as well. The circuits may be a processor circuit and storage circuit, the processor circuit executing instructions represented electronically in the storage circuits.

A processor or processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 5:
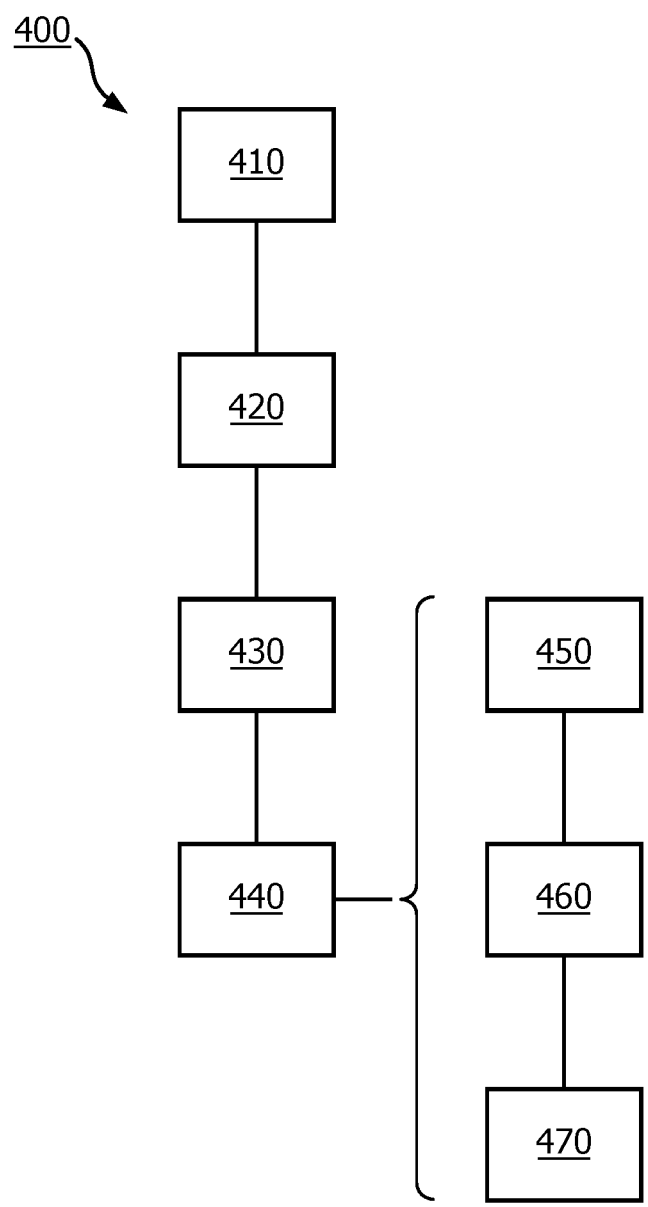
Figure 6:
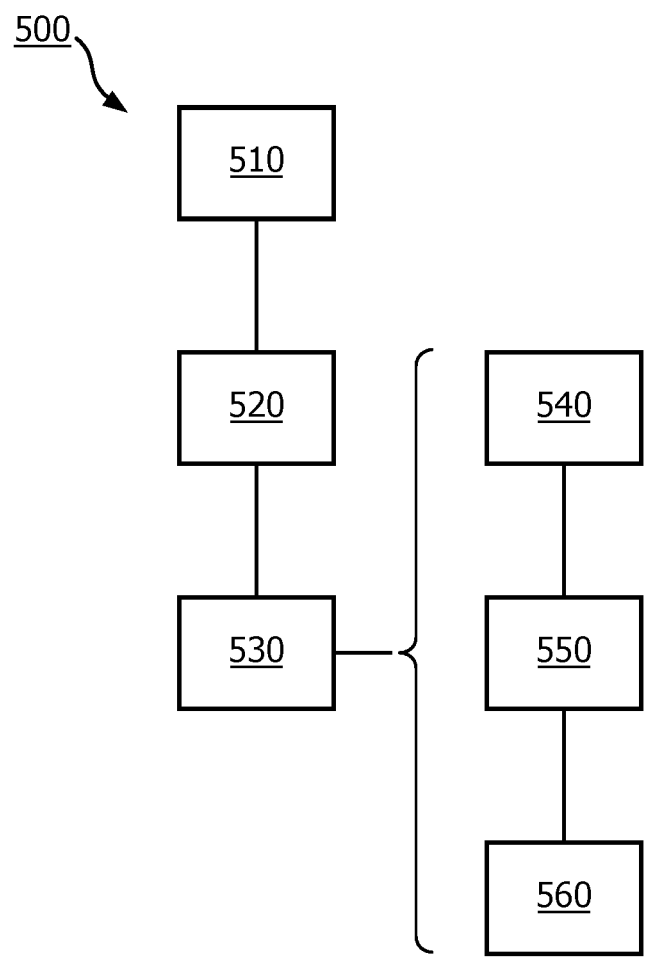

FIG. 5 schematically shows an example of an embodiment of a data method 400. Data method (400) is for learning a classifier from a data set and associated classification data, the data set and associated classification data being stored across multiple data devices. Data method 400 comprises establishing (410) communication with multiple computation devices, storing (420) a local part of the data set and a corresponding local part of the associated classification data, the other data devices of the multiple data devices storing a respective local part of the data set and a corresponding local part of the associated classification data, and obtaining (430) initial values for classifier parameters of the classifier, iteratively learning (440) the classifier parameters of the classifier starting from the initial values, an iteration comprising computing (450) a local error term for the classifier from the associated classification data and from classifier results obtained from applying the classifier with the current classifier parameters to the local part of the data set, providing (460) the local error term as a private input to the multiple computation devices for a multi-party computation among the multiple computation devices, receiving (470) from at least one of the multiple computation devices new values for the classifier parameters FIG. 6 schematically shows an example of an embodiment of a computation method 500. Computation method (500) is for learning a classifier from a data set and associated classification data, the data set and associated classification data being stored across multiple data devices. Computation method 500 comprises establishing (510) communication with the multiple computation devices and the multiple data devices, obtaining (520) initial values for classifier parameters of the classifier, iteratively learning (530) the classifier parameters of the classifier starting from the initial values, an iteration comprising jointly with the multiple computation devices computing (540) a global error term over the data set from local error terms of the multiple data devices as private inputs, wherein the joint computation is a multi-party computation and the global error term is shared over the multiple computation devices, jointly with the multiple computation devices computing (550) a noise term, wherein the joint computation is a multi-party computation and the noise term is shared over the multiple computation devices, jointly with the multiple computation devices computing (560) new values for the classifier parameters from the global error term and the noise term as private inputs and from the current values of the classifier parameters, wherein the joint computation is a multi-party computation and the multiple computation devices receive the new values of the classifier parameters.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 400 or 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of embodiments of the methods. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
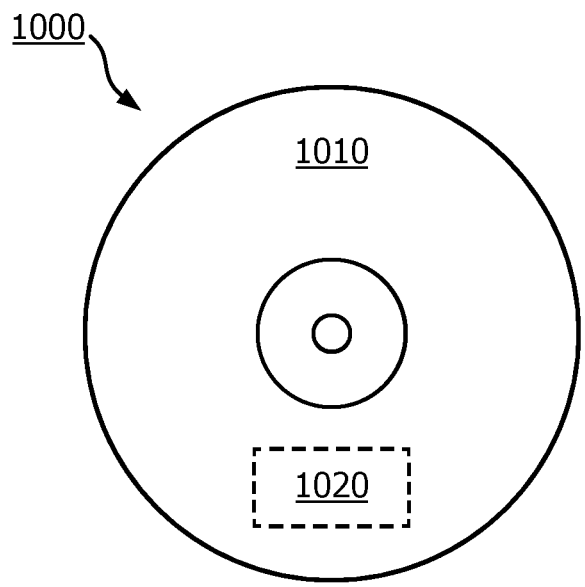

FIG. 7a shows a computer readable medium 1000 having a writable part 1010 comprising a computer program 1020, the computer program 1020 comprising instructions for causing a processor system to perform a data method or a computation method or both, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform the data method or computation method or both.

Figure 7B:
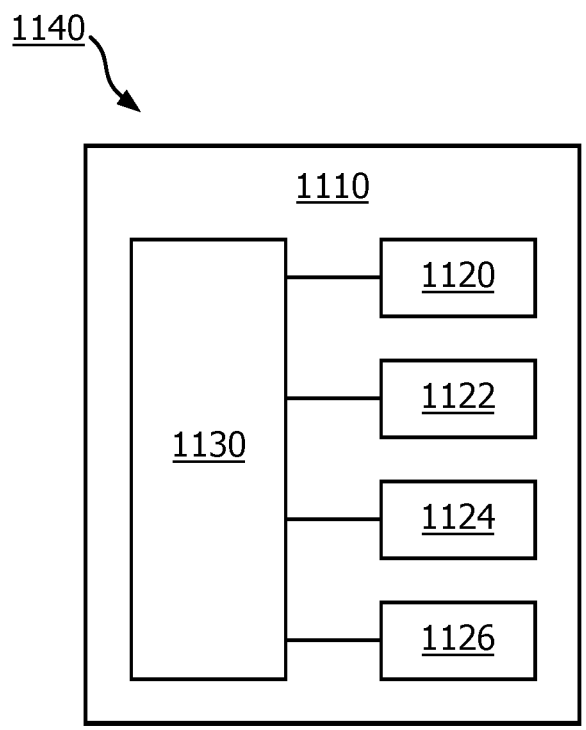

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the data device and/or computation device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computation system for learning a classifier from a data set and associated classification data, the system comprising multiple data devices and multiple computation devices, the data set and associated classification data being stored across the multiple data devices, wherein the classifier is a logistic regression classifier, and wherein I: a data device of the multiple data devices comprises
   a communication interface arranged to communicate with the multiple computation devices,
   a storage arranged to store a local part of the data set and a corresponding local part of the associated classification data, the other data devices of the multiple data devices storing a respective local part of the data set and a corresponding local part of the associated classification data,
   a processor configured to
      obtain initial values for classifier parameters of the classifier,
      iteratively learn the classifier parameters of the classifier starting from the initial values, an iteration comprising
         computing a local error term for the classifier from the associated classification data and from classifier results obtained from applying the classifier with the current classifier parameters to the local part of the data set,
         providing the local error term as a private input to the multiple computation devices for a multi-party computation among the multiple computation devices,
         receiving from at least one of the multiple computation devices new values for the classifier parameters,
      the processor further configured to compute a local convergence term from the local part of the data set for applying to a global error term for increasing convergence of the iteration, providing the local convergence term as a private input to the multiple computation devices for a multi-party computation; and II: a computation device of the multiple computation devices comprises,
  a communication interface arranged to communicate with the multiple computation devices and the multiple data devices,
  a processor configured to
    obtain initial values for classifier parameters of the classifier,
    iteratively learn the classifier parameters of the classifier starting from the initial values, an iteration comprising
      jointly with the multiple computation devices computing a global error term over the data set from the local error terms of the multiple data devices as private inputs, wherein the joint computation is a multi-party computation and the global error term is shared over the multiple computation devices,
      jointly with the multiple computation devices computing a noise term, wherein the joint computation is a multi-party computation and the noise term is shared over the multiple computation devices,
      jointly with the multiple computation devices compute new values for the classifier parameters from the global error term and the noise term as private inputs and from the current values of the classifier parameters, wherein the joint computation is a multi-party computation.

2. A computation system as in claim 1, wherein
at least one data device of the multiple data devices is a computation device of the multiple computation devices, or
each of the multiple data devices is different from the multiple computation devices.

3. A computation system as in claim 1, wherein the data set comprises multiple records, the associated classification data comprising a classification for the multiple records, the local error term being computed over the records in the local part of the data set.

4. A computation system as in claim 3, wherein the multiple records comprise a set of numbers, and wherein the classifier parameters comprise a parameter for each number in the set of numbers.

5. A computation system as in claim 1, wherein the data device or computation device is configured to, after learning the classifier,
  receive an input record
  apply the classifier to the input record,
  communicate the classifier output.

6. A data device for learning a classifier from a data set and associated classification data, the data set and associated classification data being stored across multiple data devices, wherein the classifier is a logistic regression classifier,
the data device comprising
  a communication interface arranged to communicate with multiple computation devices,
  a storage arranged to store a local part of the data set and a corresponding local part of the associated classification data, the other data devices of the multiple data devices storing a respective local part of the data set and a corresponding local part of the associated classification data, and
  a processor configured to
    obtain initial values for classifier parameters of the classifier,
    iteratively learn the classifier parameters of the classifier starting from the initial values, an iteration comprising
      computing a local error term for the classifier from the associated classification data and from classifier results obtained from applying the classifier with the current classifier parameters to the local part of the data set,
      providing the local error term as a private input to the multiple computation devices for a multi-party computation among the multiple computation devices,
      receiving from at least one of the multiple computation devices new values for the classifier parameters,
  the processor further configured to compute a local convergence term from the local part of the data set for applying to a global error term for increasing convergence of the iteration, providing the local convergence term as a private input to the multiple computation devices for a multi-party computation.

7. A data device as in claim 6, wherein
one or more of the following elements are available at the data device in the plain: the local part of the data set, the corresponding local part of the associated classification data, the classifier parameters, the local error term, and the local convergence term.

* * * * *